G. H. SCHUETT.
SAFE FOR MILK AND THE LIKE.
APPLICATION FILED AUG. 6, 1915.

1,179,044.

Patented Apr. 11, 1916.

WITNESSES.

INVENTOR.
GEORGE H. SCHUETT.

UNITED STATES PATENT OFFICE.

GEORGE HERBERT SCHUETT, OF BERLIN, ONTARIO, CANADA.

SAFE FOR MILK AND THE LIKE.

1,179,044. Specification of Letters Patent. Patented Apr. 11, 1916.

Application filed August 6, 1915. Serial No. 44,077.

*To all whom it may concern:*

Be it known that I, GEORGE HERBERT SCHUETT, of the city of Berlin, in the county of Waterloo, in the Province of Ontario, Canada, have invented certain new and useful Improvements in Safes for Milk and the like, of which the following is the specification.

My invention relates to improvements in safes for milk and the like and the object of the invention is to devise a receptacle for retaining bottles of milk and preventing the removal of the same by any unauthorized person after being delivered until removed by the purchaser and in which means are provided for keeping the milk cool during the above period of time and it consists essentially of a cylindrical casing having an ice chamber at the top, a rod turnably held by the top and bottom of the casing and extending centrally and vertically through such casing and provided with a turning handle at its upper end exterior to the casing, radially extending arms carried by the turnable member, a barrier wall extending radially between such turnable member and the wall of the casing, a door opening and door located in the casing at one side of such barrier through which the bottles of milk are delivered into the casing and a door opening and door at the opposite side of the barrier, and means for locking such door in the closed position as hereinafter more particularly explained by the following specification.

Figure 1:
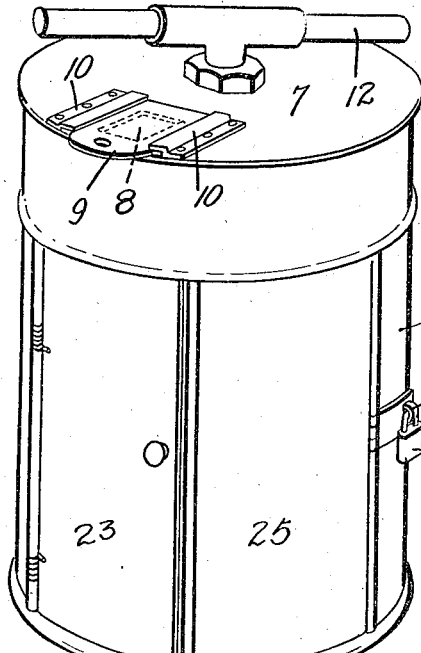
Figure 2:
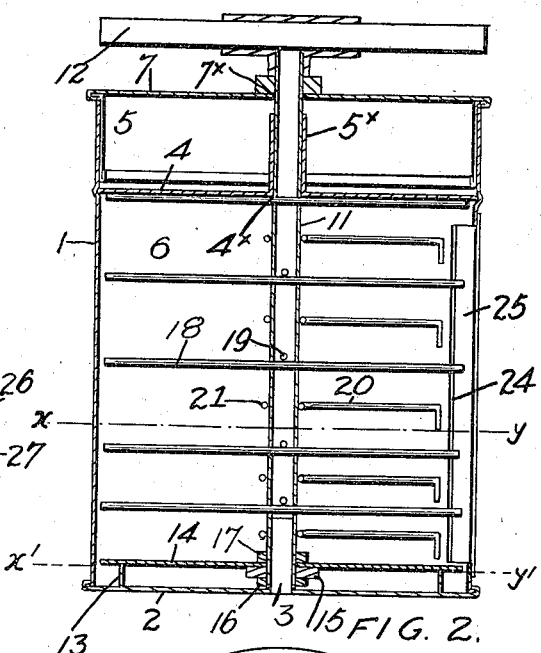
Figure 4:
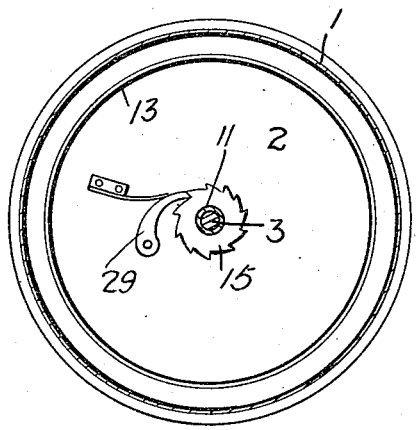
Figure 3:
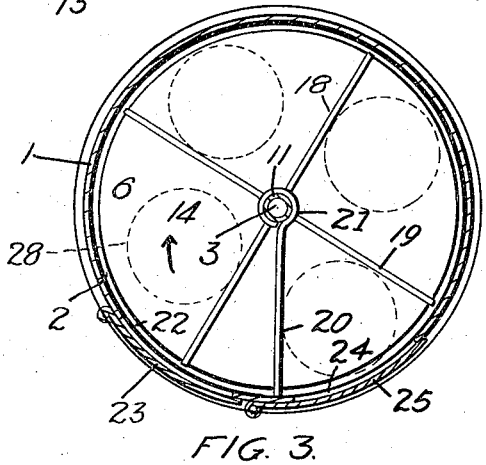

Figure 1, is a general perspective view of my device. Fig. 2, is a vertical section through Fig. 1. Fig. 3, is a plan section on line $x$—$y$ Fig. 2. Fig. 4, is a plan section on line $x'$—$y'$ Fig. 2.

In the drawings like letters of reference indicate corresponding parts in each figure.

1 indicates a cylindrical casing provided with a permanent bottom 2 from which a stud 3 projects upwardly centrally thereof.

4 indicates a horizontal partition dividing the cylindrical casing into two chambers 5 and 6.

7 indicates a cover for the chamber 5.

8 indicates an opening in the cover 7.

9 indicates a closure for the opening 8. The closure 9 is slidably held in guides 10 secured to the cover 7. By slidably removing the cover 9 ice may be fed through the opening 8 into the ice chamber 5 whenever required and water, which accumulates within such chamber due to melting ice, may be poured off.

$4^x$ indicates an opening in the center of the horizontal partition 4.

$5^x$ indicates a tubular portion extending upwardly from the horizontal partition 4 from around the opening $4^x$ for a purpose which will hereinafter appear.

11 indicates a tubular rod extending through the opening $7^x$, tubular portion $5^x$, opening $4^x$ and vertically through the center of the chamber 6 so as to rest upon the bottom 2 of such chamber, the stud 3 extending upwardly into the bottom end of the tube so as to form a bearing therefor.

12 indicates a handle secured to the upper end of the tube 11 for the purpose of turning the tubular rod.

13 indicates an annular flange extending upwardly from the bottom 2 of the casing 1.

14 indicates a disk secured to the tubular rod 11 and bearing in proximity to its outer edge upon the upper edge of the annular flange 13.

15 indicates a ratchet wheel secured to the tubular rod 11, the ratchet wheel and disk 14 being secured to the rod 11 by securing nuts 16 and 17.

18 indicates a series of cross bars extending horizontally through the tubular rod 11.

19 indicate a similar series of cross bars extending through the tubular rod 11 at right angles to the rods 18.

20 indicate barrier bars provided at their inner ends with looped portions 21 freely surrounding the tubular rod 11. The outer ends of the barrier bars 20 are preferably downturned as shown in Fig. 2 of the drawings and soldered or otherwise suitably secured to the inner face of the wall of the cylindrical casing 1.

22 indicates a door opening located on one side of the barrier bars 20.

23 indicates a spring door forming a closure for the door opening 22.

24 indicates a door opening located on the opposite side of the barrier bars 20 to the door opening 22.

25 indicates a door forming a closure for the door opening 24.

26 indicates a hasp by which the door may be held in the closed position and locked by a suitable pad lock 27.

28 indicate the bottles of milk shown by dotted lines in Fig. 3.

29 indicates a spring held dog carried by the bottom of the casing 1 in engagement with the ratchet wheel 15.

Having described the principal parts involved in my invention I will briefly describe the operation of the same. When the milkman delivers the milk he turns the handle 12 so that the rods 18 or 19 are in alinement with the barrier bars 20. He then inserts the milk bottles through the door opening 22 and then turns the handle so as to carry the cross bars 18 and 19 circumferentially in the direction of the arrow. If desired when the next radial portion of the cross bar 18 or 19 is in alinement with the barrier bars 20 another bottle may be inserted in the cylindrical casing. This operation is continued until the first inserted bottle is carried into contact with the barrier wall formed by the barrier bars 20. The ratchet wheel 15 and dog 29 permits of a turning movement in the above described direction but prevents any movement in the opposite direction and, therefore, the bottles cannot be carried back to the inlet opening after they have been once carried from the inlet opening toward the withdrawal opening 24. When the purchaser desires to remove a bottle of milk all that he has to do is to unlock the loop 26 and remove one bottle at a time. After removing the first bottle, which is located opposite the withdrawal door opening 24 the handle 12 is turned so that the next bottle in succession is carried opposite to the withdrawal door opening.

From this description it will be seen that I have devised a very simple device whereby milk may be kept in good condition after being delivered until the purchaser desires to use the same and in which positive means are provided for preventing the withdrawal of the milk bottles from the safe by any unauthorized person.

What I claim as my invention is:

1. A milk safe comprising a cylindrical casing having an inlet opening and a withdrawal opening for the milk bottles, a barrier extending radially from the wall of the casing between the inlet and withdrawal openings, and one way means for carrying the bottles circumferentially around the casing from the inlet opening on one side of the barrier to the withdrawal opening on the opposite side of the barrier, and a suitably locked bar forming a closure for the withdrawal opening.

2. A milk safe comprising a cylindrical casing having an inlet opening and a withdrawal opening for the milk bottles, a barrier extending radially from the wall of the casing between the inlet and withdrawal openings, and means for carrying the bottles circumferentially around the casing from the inlet opening on one side of the barrier to the withdrawal opening on the opposite side of the barrier, a suitably locked door forming a closure for the withdrawal opening, and means for preventing carrying of the bottles circumferentially in the opposite direction.

3. A milk safe comprising a cylindrical casing provided with an inlet door opening and a withdrawal door opening, a turnable rod journaled centrally within the casing, radial rods extending therefrom into proximity with the inner periphery of the casing, barrier bars extending from the inner periphery of the casing between the inlet and withdrawal door openings to the turnable rod and between which the radial rods pass when turned in one direction, and means for preventing the movement of the radial rods in the opposite direction, and a locked closure for the withdrawal door.

4. A milk safe comprising a cylindrical casing provided with an inlet door opening and a withdrawal door opening, a turnable rod journaled centrally within the casing, radial rods extending therefrom into proximity with the inner periphery of the casing, barrier bars extending from the inner periphery of the casing between the inlet and withdrawal door openings to the turnable rod and between which the radial rods pass when turned in one direction, a ratchet wheel carried by the turnable rod, and a spring held dog carried by the cylindrical casing in engagement with the ratchet wheel.

5. A milk safe comprising a cylindrical casing divided horizontally to form an upper ice chamber and a lower milk bottle retaining chamber having an inlet opening and a withdrawal opening, a barrier extending radially from between the inlet and withdrawal openings, means for carrying the bottles circumferentially from the inlet opening on one side of the barrier to the withdrawal opening on the opposite side of the barrier, means for preventing the return movement of the bottles, and a suitably locked door forming a closure for the withdrawal opening.

6. A milk safe comprising a casing having an inlet and exit opening, a barrier extending inwardly from the casing wall from between the openings, and one way means for carrying a milk bottle when inserted through the inlet opening around to the opposite side of the barrier opposite the exit opening.

GEORGE HERBERT SCHUETT.

Witnesses:
C. SCHWEITZER,
M. R. ZIEGLER.